United States Patent [19]
Rödel et al.

[11] Patent Number: 5,474,407
[45] Date of Patent: Dec. 12, 1995

[54] DRILLING TOOL FOR METALLIC MATERIALS

[75] Inventors: Holger Rödel, Neu Isenburg; Manfred Grunsky, Rehwinkel, both of Germany

[73] Assignee: Stellram GmbH, Heusenstamm, Germany

[21] Appl. No.: 377,826

[22] Filed: Jan. 25, 1995

[51] Int. Cl.$^6$ ..................................... B23B 51/00
[52] U.S. Cl. .......................... 408/227; 408/233; 408/713
[58] Field of Search .................... 408/227, 231, 408/233, 713, 238, 239 R, 239 A

[56] References Cited

U.S. PATENT DOCUMENTS

| | | | |
|---|---|---|---|
| 2,237,901 | 4/1941 | Chun | 408/223 |
| 2,400,856 | 5/1946 | Thompson | 408/233 |
| 3,776,656 | 12/1973 | Benjamin | 408/239 R |
| 4,493,596 | 1/1985 | Grunsky et al. | |

FOREIGN PATENT DOCUMENTS

| | | |
|---|---|---|
| 7139323 | 9/1972 | Germany . |
| 3204210 | 8/1993 | Germany . |

*Primary Examiner*—Daniel W. Howell
*Attorney, Agent, or Firm*—Darby & Darby

[57] ABSTRACT

A Drilling tool for metallic materials comprises a holder (1) having an axial clamping slot in which a plate-shaped drilling blade (2) is inserted and clamped against a limb (8) of the clamping slot by means of a threaded pin (3), which is provided with a head (21) and which engages in a bore (15) in the drilling blade (2) and in a bore (12) in said limb (8). The center axis (13) of the limb bore (12) is offset relative to the center axis (24) of the drilling blade bore (15). The mutually facing circumferential edges of the head (21) of the threaded pin and the bore (15) of the drilling blade is bevelled. A centering pin (11) is inserted in the holder (1) and engages in a centering slot (18) in that side (17) of the drilling blade (2), which is contacting the base surface (9) of the clamping slot (4) to center the drilling blade (2) with respect to the rotational axis (6) of the holder (1). For achieving a more exact centering the nominal width of the centering slot (18) is selected to be greater than that of the portion of the centering pin (11) engaging in the centering slot (18), while the direction and amount of the offset of the central axes (13, 24) of the bore (15) of the drilling blade and the bore (12) of the limb are selected such that in the tightened state of the threaded pin (3) only one side face (20) of the centering slot (18) bears on one side of the centering pin (11) in the centered position of the drilling blade (2).

5 Claims, 6 Drawing Sheets

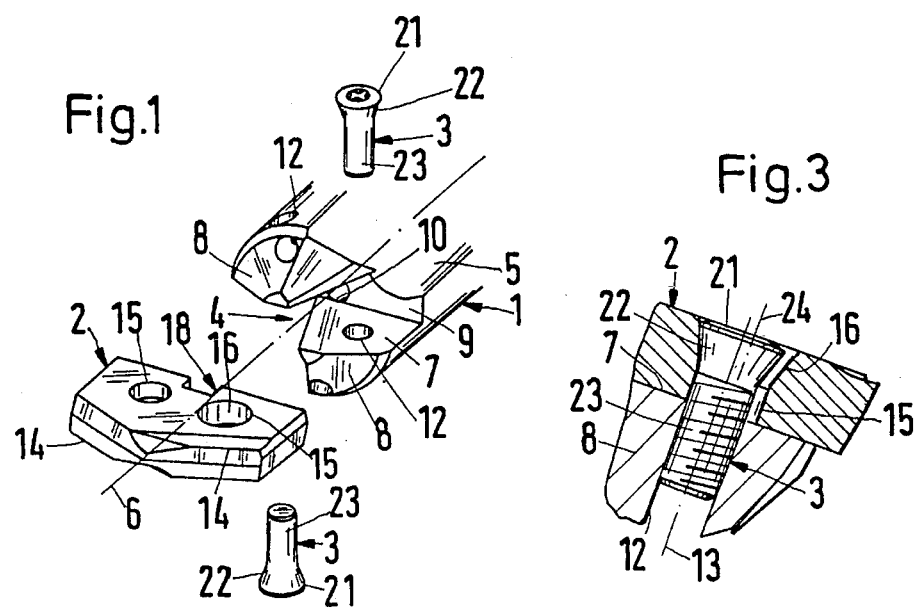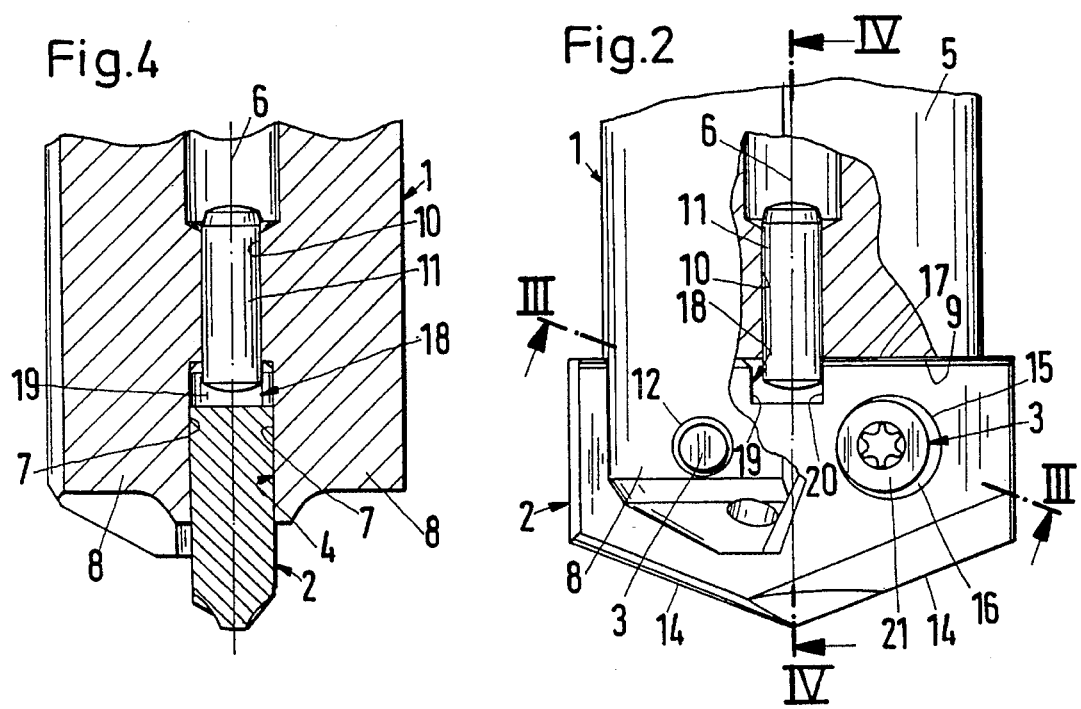

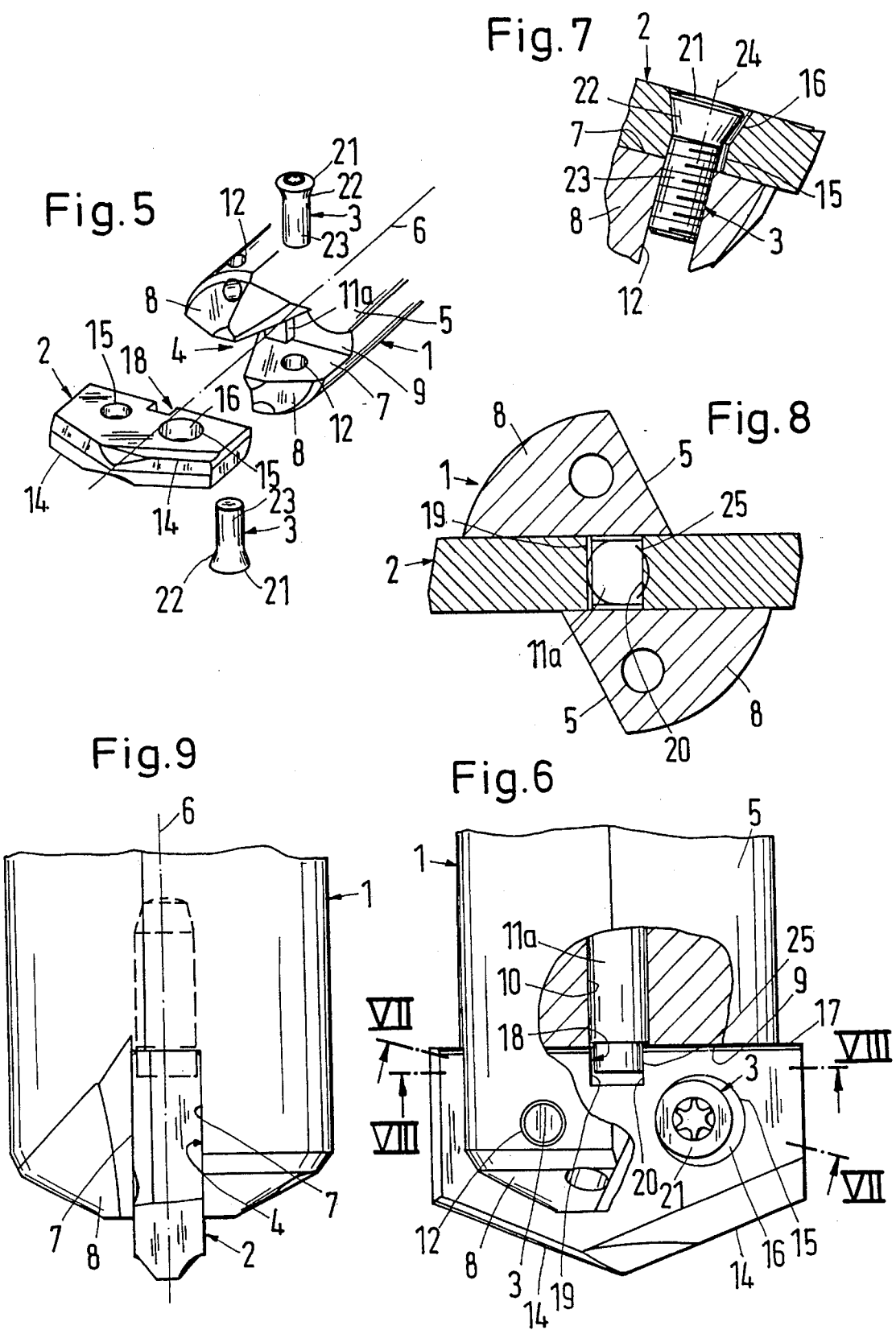

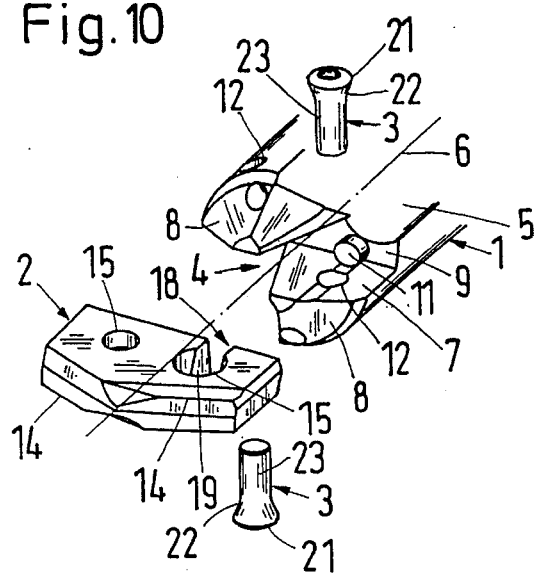
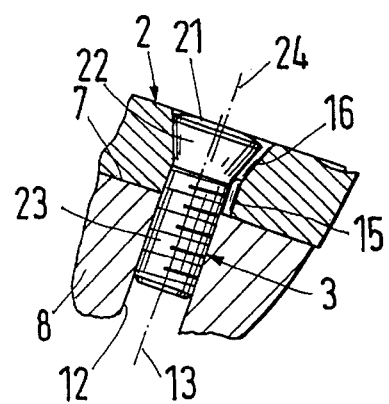
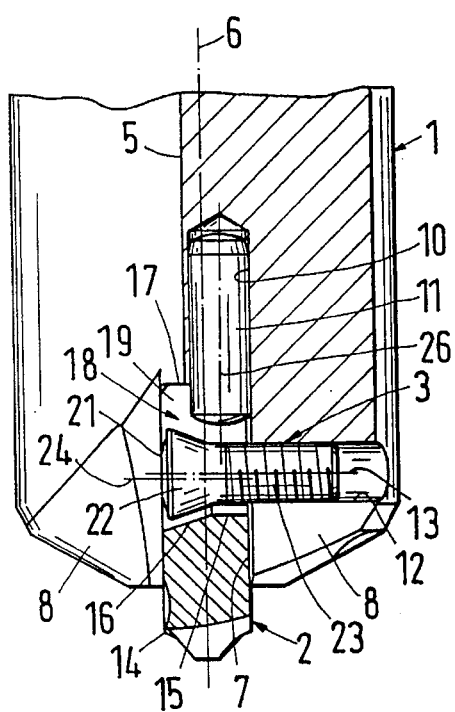
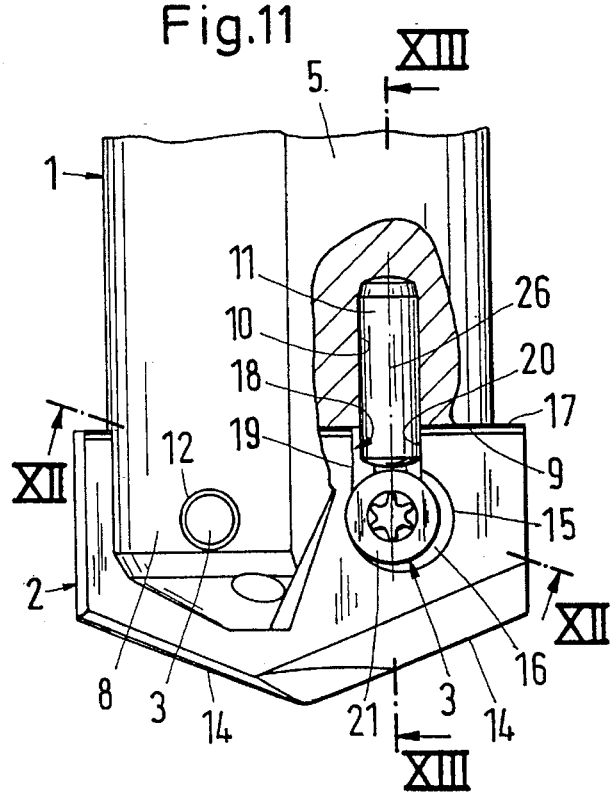

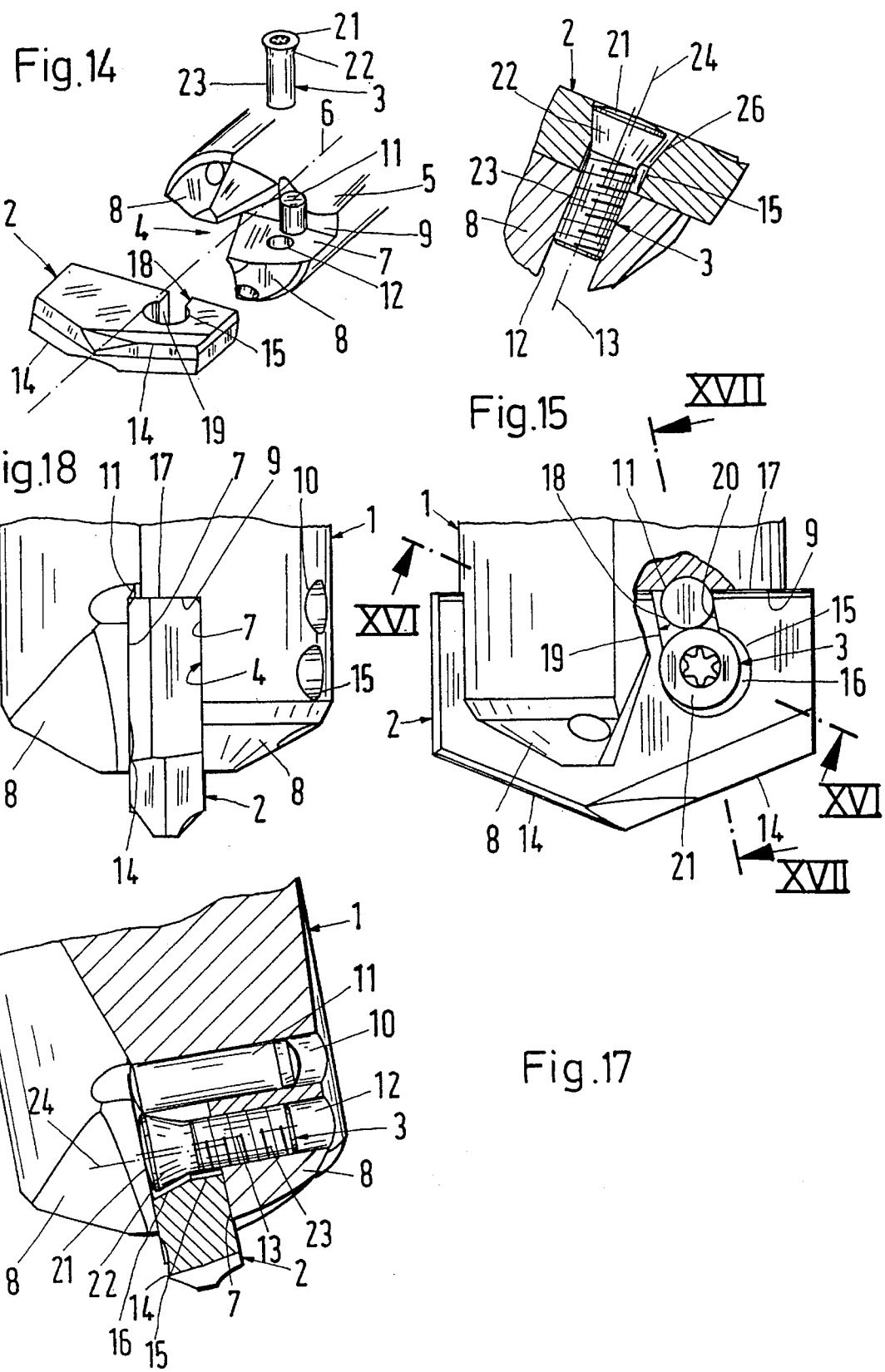

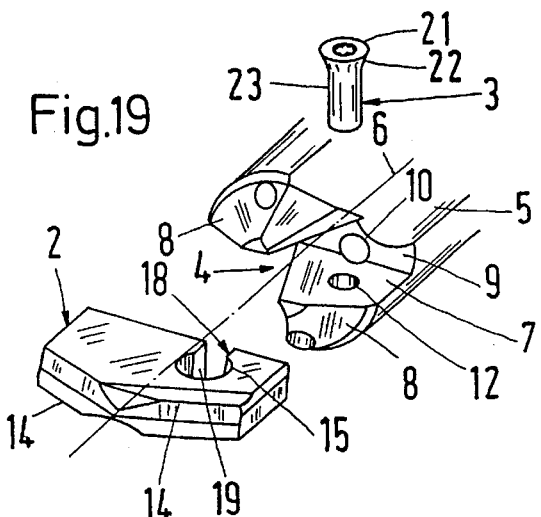
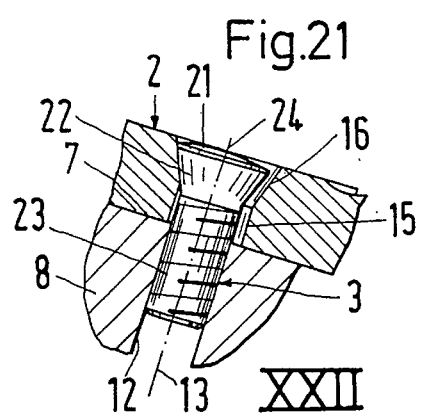
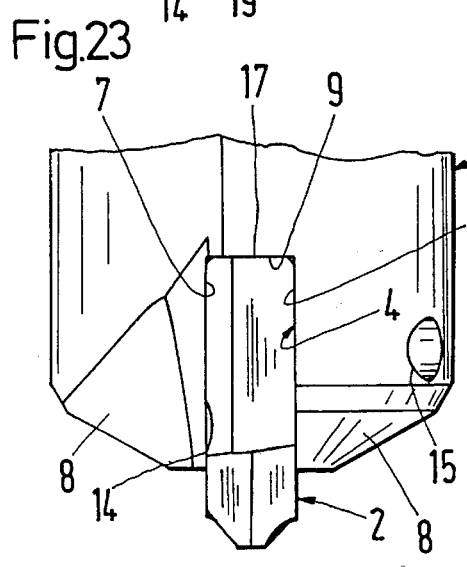
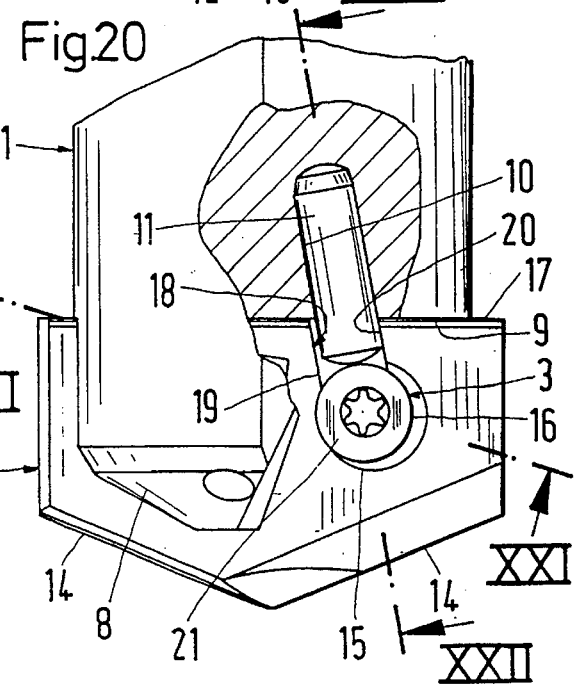
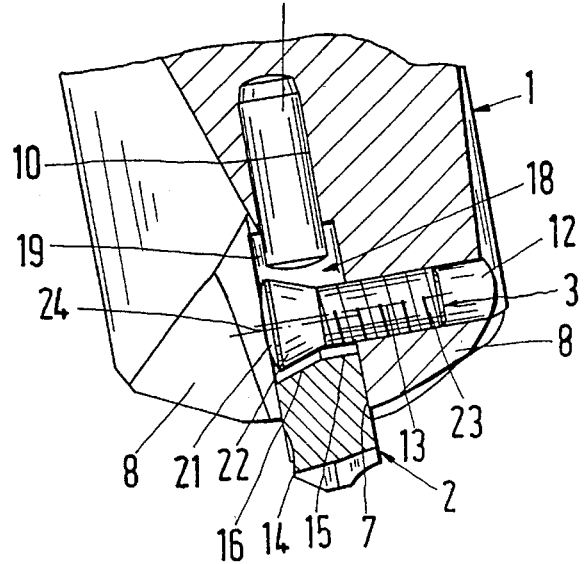

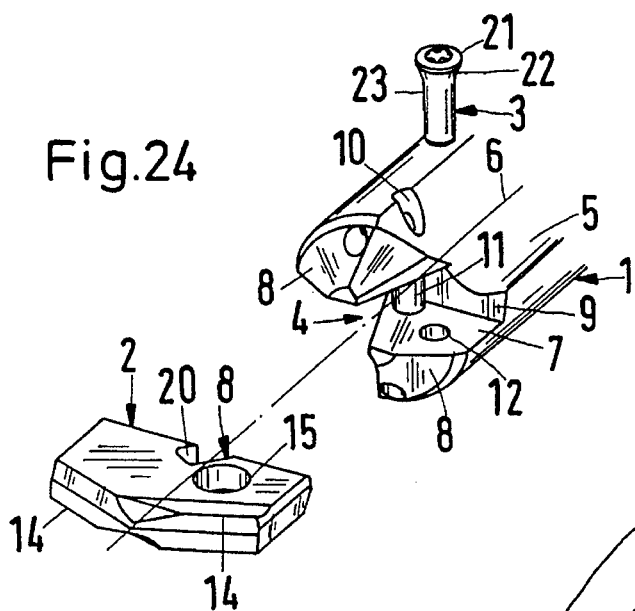
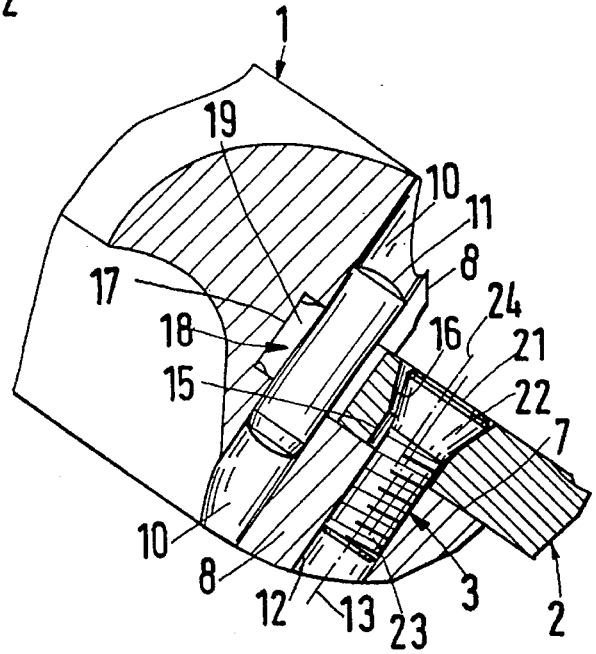
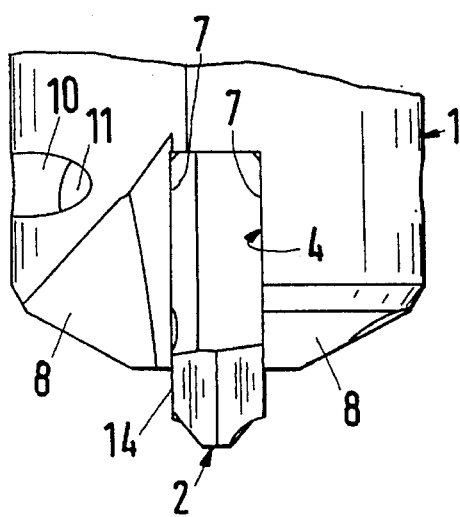
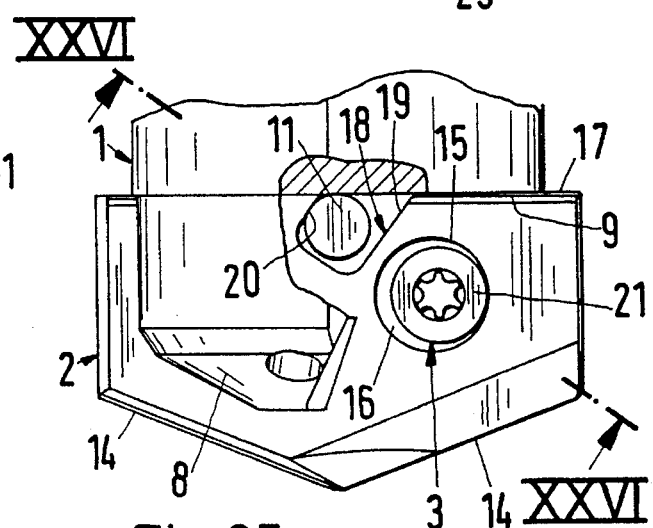

DRILLING TOOL FOR METALLIC MATERIALS

BACKGROUND OF THE INVENTION

The invention relates to a drilling tool for metallic materials, comprising a holder having an axial clamping slot in which a plate-shaped drilling blade is inserted to bear against the base surface of the clamping slot and is clamped against a limb of the clamping slot by means of at least one threaded pin, which is provided with a head and which engages in a bore in the drilling blade and in a bore in said limb of the clamping slot, wherein the center axis of the bore in said limb of the clamping slot is offset relative to the center axis of the bore of the drilling blade and at least one of two mutually facing circumferential edges of the threaded pin and the bore of the drilling blade is bevelled, and further comprising a centering pin which is inserted in the holder and engages in a centering slot in the side of the drilling blade adjacent to the base surface of the clamping slot so as to center the drilling blade with respect to the rotational axis of the holder.

In the case of this known drilling tool (German patent specification 32 04 210 C2) the tolerance range of the nominal width of the centering slot must be so selected that the centering slot exhibits an excess dimension relative to the nominal diameter of the centering pin so as to be able to guide the centering pin into the centering slot. This has the consequence that the drilling blade cannot be precisely centered relative to the rotational axis of the holder or drilling tool. The result is an inexact rotational course of the drilling blade, particularly of its tip.

SUMMARY OF THE INVENTION

The invention has as its object the provision of a drilling tool in which a precise centering of the drilling blade is possible.

According to the invention this object is attained in the case of a drilling tool in that the nominal width of the centering slot is selected to be greater than that of the portion of the centering pin engaging in the centering slot and that the direction and amount of the offset of the center axes of the bore of the drilling blade and bore of the limb of the clamping slot are so selected that in the tightened state of the threaded pin only one side face of the centering slot bears on one side of the centering pin in the centered position of the drilling blade.

In this construction the tolerance range of the position of the side face of the centering slot bearing against the centering pin can be selected to be as small as desired, so that a very precise centering of the drilling blade and thus an improved rotational course, particularly of the drilling blade tip, is possible. This gives a longer edge life of the drilling blade.

Preferably it is ensured that the centering slot extends in the direction of or obliquely relative to the rotational axis of the holder and the direction of the offset is so selected that the drilling blade in the tightened state of the threaded pin is pressed against the base surface of the clamping slot by a first clamping force component and, at said one side face of the centering slot, against said one side of the centering pin by a second clamping force component. This construction guarantees that the drilling blade bears not only in a radially firm manner against the centering pin, but also in an axially firm manner against the base of the clamping slot, so that vibrations of the drilling blade or drilling tool during drilling are largely avoided.

It is particularly advantageous if the mutually adjacent side faces of the centering slot and centering pin are flat. The contacting faces are thereby subjected to a lower contact pressure and accordingly to a lesser deformation than in the case of a line contact, which in turn increase the accuracy of the centering.

It can be ensured that the centering pin passes through the clamping slot and the centering slot and engages at both ends in bores of the limb of the clamping slot. In this construction the centering pin is radially supported at its two ends. It can therefore bend less easily by comparison with mounting at one end. This also contributes to increasing the accuracy of the centering.

BRIEF DESCRIPTION OF THE DRAWINGS

The invention and developments thereof are described in more detail in the following by way of embodiments with reference to the drawing, in which:

FIG. 1 is an exploded view of one end portion of a drilling tool according to the invention;

FIG. 2 is a plan view of said one end portion of the drilling tool according to claim 1, in assembled and partly broken-away state;

FIG. 3 is a part of the section III—III of FIG. 2;

FIG. 4 is the section IV—IV of FIG. 2;

FIG. 5 is an exploded view of one end portion of a second embodiment of a drilling tool according to the invention;

FIG. 6 is a plan view of the end portion according to FIG. 5, in assembled and partly broken-away state;

FIG. 7 is a part of the section VII—VII of FIG. 6;

FIG. 8 is the section VIII—VIII of FIG. 6;

FIG. 9 is a side view of the end portion according to FIG. 6;

FIG. 10 is an exploded view of one end portion of a third embodiment of a drilling tool according to the invention;

FIG. 11 is a plan view of the end portion according to FIG. 10, in assembled and partly broken-away state;

FIG. 12 is a part of the section XII—XII of FIG. 11;

FIG. 13 is the section XIII—XIII of FIG. 11;

FIG. 14 is an exploded view of one end portion of a fourth embodiment of a drilling tool according to the invention;

FIG. 15 is a plan view of the end portion according to FIG. 14, in assembled and partly broken-away state;

FIG. 16 is a part of the section XVI—XVI of FIG. 15;

FIG. 17 is the section XVII—XVII of FIG. 15;

FIG. 18 is a side view of the end portion according to FIG. 15;

FIG. 19 is an exploded view of one end portion of a fifth embodiment of a drilling tool according to the invention;

FIG. 20 is a plan view of the end portion according to FIG. 19, in assembled and partly broken-away state;

FIG. 21 is a part of the section XXI—XXI of FIG. 20;

FIG. 22 is the section XXII—XXII of FIG. 20;

FIG. 23 is a side view of the end portion according to FIG. 20;

FIG. 24 is an exploded view of one end part of a sixth embodiment of a drilling tool according to the invention;

FIG. 25 is a plan view of the end portion according to FIG. 24, in assembled and partly broken-away state;

FIG. 26 is the section XXVI—XXVI of FIG. 25; and

FIG. 27 is a side view of the end portion according to FIG. 25.

DESCRIPTION OF THE PREFERRED EMBODIMENT

The drilling tool according to FIGS. 1 to 4 comprises a holder 1, a drilling blade 2 and two threaded pins 3 in the form of setscrews.

The end portion of the holder 1 that is not illustrated is clamped in a drilling machine. The end portion that is illustrated has a clamping slot 4 in the free end and two swarf discharge grooves 5, which are diametrically opposite one another with respect to the rotational axis 6 of the holder 1 or drilling tool.

The clamping slot 4 is bounded by clamping surfaces 7 of the clamping slot limbs 8. The base surface 9 of the clamping slot 4 is disposed at a right angle to the rotational axis 6 and the clamping surfaces 7. A cylindrical centering pin 11 is inserted, by a press fit, into a bore 10 in the base surface 9 of the clamping slot 4, the bore being coaxial with the rotational axis 6. Each clamping slot limb 8 is provided with a threaded bore 12, the center axis 13 of which is disposed perpendicularly to the clamping surfaces 7, and at a spacing laterally from the rotational axis 6 lies in a respective one of the regions of the holder 1 left untouched by the swarf discharge grooves 5.

The drilling blade 2 has a drilling tip, which in the assembled state of the drilling tool projects beyond the free end of the holder 1, with cutter sections 14, which include an obtuse angle. A respective bore 15, one circumferential edge 16 of which is conically bevelled, is formed in the drilling blade 2 on each side of the rotational axis 6.

The surface 17 of the drilling blade 2 facing away from the drilling knife tip is disposed perpendicularly to the plane of the drilling blade 2 or to the rotational axis 6 and serves for abutment of the drilling blade 2 with the base surface 9 of the clamping slot 4. Formed in this surface 17 is a centering slot 18, which is right-angled in the plan view according to FIG. 2 and the nominal width of which is selected to be greater than that of the portion of the centering pin 11 engaging in the centering slot. The centering slot 18 lies, in the plan view according to FIG. 2, eccentrically of the rotational axis 6, wherein its side faces 19 and 20 are disposed at both sides of the rotational axis. The centering slot 18 serves for reception of the centering pin 11, so as to center the drilling blade 2 in the holder 1.

Each threaded pin 3 has a head 21 with a circumferential edge 22, which is conically bevelled at the same angle as the circumferential edge 16 of the bores 15, and an externally threaded shank 23, which fits in a respective one of the threaded bores 12. The center axis 24 of the bore 15 at the right in FIG. 2 or of the circumferential edge 16 thereof and the center axis 13 of the associated bore 12 of the clamping slot limb lie in a transverse plane of the holder 1, which coincides with the plane of the section III—III and includes an acute angle with the rotational axis on the side of the tip of the drilling blade 2, wherein the center axes 13 and 24 are offset relative to one another in the mentioned transverse plane so that the center axis 24 of the bore 15 of the drilling blade 2 or the circumferential edge 16 thereof has a somewhat greater spacing from the base surface 9 of the clamping slot 4 and from the rotational axis 6 than the center axis 13 of the threaded bore 12 formed in the clamping slot limb 8 which is at the right in FIG. 2.

The center axes of the bores 12 and 15 at the left in FIGS. 1 and 2 thereagainst lie in a plane parallel to the plane of the section III—III, wherein their spacings relative to the base surface 9 and rotational axis 6 are the reverse of those in the case of the center axes 13 and 24, illustrated in FIG. 3, of the bores 12 and 15 at the right in FIGS. 1 and 2. The direction and amount of the offset of the center axes 13 and 24 are in that case so selected that in the untightened state of the threaded pins 3 only the one side face 20 of the centering slot 18 bears against the one side of the centering pin 11 in the centered position of the drilling blade 2, as is illustrated in FIG. 2. This construction has the advantage that the position of the side face 20 of the centering slot 18 coming into contact with the centering pin 11 on tightening of the threaded pin 3 can have a very closely dimensioned tolerance, so that the drilling blade is centered as precisely as possible, which improves the rotational course of the drilling blade 2, particularly of its tip, and prolongs the edge life of the drilling blade 2. At the same time the threaded pin 3 exerts, by its head 21, a first clamping force component against the base surface 9 of the clamping slot 4 and, by the one side face 20 of the centering slot 18, a second clamping force component against the one side of the centering pin 11. The drilling blade 2 is therefore pressed axially firmly against the base surface 9 of the clamping slot 4 and radially against the centering pin 11. The drilling blade 2 is thus secured against vibrations during drilling to a particularly high degree.

The second embodiment according to FIGS. 5 to 9 differs from the first embodiment according to FIGS. 1 to 4 merely in that the portion of the centering pin 11a engaging in the centering slot 18 is formed as a square (see FIGS. 5 and 8 in particular), so that the mutually adjacent side surfaces 20 and 25 of centering slot 18 and centering pin 11a are flat and thus bear against one another over a large area and are subjected to a smaller deformation than in the case of the line contact in the first embodiment. This contributes to further increase in centering accuracy.

The third embodiment according to FIGS. 10 to 13 differs from the first embodiment only in that the bore 10 is not coaxial with the rotational axis 6, but laterally displaced relative to this so far that its center axis 26 intersects the center axis 13 of the one (at the right in FIGS. 10 and 11) threaded bore 12 and the centering slot 18 is formed to be continuous to the one (at the right in FIGS. 10 and 11) bore 15 of the drilling blade 2, wherein the centering slot 18 is not only wider than the centering pin 11, but also somewhat wider than the diameter of the threaded shank 23 of the threaded pin 3. This construction has the advantage that the one (at the right in FIGS. 10 and 11) threaded pin 3 does not have to be completely unscrewed from its clamping slot limb 8 for exchange of the drilling blade.

The fourth embodiment according to FIGS. 14 to 18 differs from the third embodiment according to FIGS. 10 to 13 substantially only in that the drilling blade 2 has only one bore 15 and also only the one clamping slot limb 8 is provided with a threaded bore 12. Correspondingly, also only one threaded pin 3 is provided. Moreover, the bore 10 for reception of the centering pin 11 extends perpendicularly to the clamping surface 7 of the one clamping slot limb 8 and through this clamping slot limb 8. The bore 10 also in part penetrates the one swarf discharge groove 5. The centering slot 18 then extends obliquely to the rotational axis 6, wherein it includes an acute angle with the rotational axis 6 on the side of the drilling blade tip. In this embodiment, too, the drilling blade in the tightened state of the threaded pin 3 is pressed by a first clamping force component against the base surface 9 of the clamping slot 4 and by a second clamping force component, at the one side face 20 of the centering slot 18, against the one side of the centering pin 11. Due to the inclined course of the centering slot 18 in conjunction with the arrangement of the centering pin 11 perpendicular to the clamping surface 7 and the cylindrical form of the pin an additional axial clamping force component is exerted on the drilling blade 2 in the direction of the base surface 17 when the threaded pin 3 is tightened. In addition, the side face 20 engages slightly behind the centering pin 11, so that the centering pin 11 also offers an additional axial support for the drilling blade 2 against axial withdrawal from the clamping slot 4. The threaded pin 3 then does not need to be completely unscrewed from the threaded bore 12 for exchange of the drilling blade 2. Also, the clamping by a second threaded pin 3 and the formation of a second threaded bore 12 are superfluous.

The fifth embodiment according to FIGS. 19 to 23 differs from the fourth embodiment according to FIGS. 14 to 18 only in that the bore 10 serving for reception of the centering pin 11 extends at the same angle obliquely relative to the rotational axis as the centering slot 18. The manner of effect is therefore practically the same as the fourth embodiment.

The sixth embodiment according to FIGS. 24 to 27 differs from the fifth embodiment according to FIGS. 19 to 23 for one thing in that the centering pin 11 penetrates the clamping slot 4 and the centering slot 18 and engages at both ends in bores 10 of the clamping slot limb 8. Here, too, the centering slot 18 includes an acute angle with the rotational axis 6 on the side facing the cutting blade tip. Thereagainst, the side of the centering pin 11 adjacent to the side face 20 of the centering slot 18 faces away from the threaded pin 3 and the offset of the center axes 13 and 24 is selected to be in the opposite direction to the offset in the case of the fifth embodiment. In this sixth embodiment, too, by virtue of the inclined course of the clamping slot 18 and the side face 20, which co-operates with the side of the centering pin 11 facing away from the threaded pin 3, of the clamping slot 18, the drilling blade 2 in the tightened state of the threaded pin 3 is pressed by a first clamping force component against the base surface 9 of the clamping slot 4 and by a second clamping force component, at the one side face 20 of the centering slot 18, against the one side of the centering pin 11.

We claim:

1. Drilling tool for metallic materials, comprising a holder (1) having an axial clamping slot (4) in which a plate-shaped drilling blade (2) is inserted to bear against the base surface (9) of the clamping slot (4) and is clamped against a limb (8) of the clamping slot by means of a threaded pin (3), which is provided with a head (21) and which engages in a bore (15) in the drilling blade (2) and in a bore (12) in said limb (8) of the clamping slot, wherein the center axis (13) of the bore (12) in said limb (8) of the clamping slot is offset relative to the center axis (24) of the bore (15) of the drilling blade (2) and at least one of two mutually facing circumferential edges (16, 22) of the head (21) of the threaded pin (3) and the bore (15) of the drilling blade is bevelled, and further comprising a centering pin (11; 11a) which is inserted in the holder (1) and engages in a centering slot (18) in that side (17) of the drilling blade (2), which is contacting the base surface (9) of the clamping slot (4), so as to center the drilling blade (2) with respect to the rotational axis (6) of the holder (1), characterized in that the nominal width of the centering slot (18) is selected to be greater than that of the portion of the centering pin (11; 11a) engaging in the centering slot (18) and that the direction and amount of the offset of the central axes (13, 24) of the bore (15) of the drilling blade and bore (12) of the limb of the clamping slot are so selected that in the tightened state of the threaded pin (3) only one side face (20) of the centering slot (18) bears on one side of the centering pin (11; 11a) in the centered position of the drilling blade (2).

2. Drilling tool according to claim 1, characterized in that the centering slot (18) extends in the direction of or obliquely relative to the rotational axis (6) of the holder (1) and the direction of the offset is so selected that the drilling blade (2) in the tightened state of the threaded pin (3) is pressed against the base surface (9) of the clamping slot (4) by a first clamping force component and, at said one side face (20) of the centering slot (18), against said one side of the centering pin (11; 11a) by a second clamping force component.

3. Drilling tool according to claim 1, characterized in that the one side of the centering pin (11a) has a side surface (25) that is mutually adjacent the side face (20) of the centering slot (18), said mutually adjacent side surfaces (20, 25) being flat.

4. Drilling tool according to claim 1, characterized in that the limb (8) has bores (10) and the centering pin (11) passes through the clamping slot and the centering slot (18) and engages at both ends in the bores (10) of the limb (8) of the clamping slot.

5. Drilling tool according to claim 1, further comprising a second threaded pin (3), said limb (8) having a second threaded bore (12) in which is screwed said second threaded pin for clamping said blade (2) against said limb (8).

* * * * *